United States Patent [19]

Scheurecker et al.

[11] 4,361,962

[45] Dec. 7, 1982

[54] ARRANGEMENT TO BE USED IN A CONTINUOUS CASTING PLANT

[75] Inventors: Werner Scheurecker, Linz; Josef Wirth, Leonding; Alois Scheinecker, Linz, all of Austria

[73] Assignee: Voest-Alpine Aktiengesellschaft, Linz, Austria

[21] Appl. No.: 193,368

[22] Filed: Oct. 2, 1980

[30] Foreign Application Priority Data

Oct. 22, 1979 [AT] Austria .................................. 6872/79

[51] Int. Cl.³ .............................................. G01B 5/00
[52] U.S. Cl. .................................... 33/143 L; 33/182; 33/147 K
[58] Field of Search ............. 33/174 L, 172 E, 147 K, 33/147 LN, 147 N, 143 L, 178 E, 178 F, 182; 164/150, 445

[56] References Cited

U.S. PATENT DOCUMENTS

| 1,905,200 | 4/1933 | Williams | 33/178 FX |
| 3,939,568 | 2/1976 | Gonus et al. | 33/143 L |
| 3,983,631 | 10/1976 | Dutzler | 33/143 L |
| 4,178,692 | 12/1979 | Schultz | 33/143 LX |

FOREIGN PATENT DOCUMENTS

| 2450405 | 9/1976 | Fed. Rep. of Germany . | |
| 2427895 | 3/1977 | Fed. Rep. of Germany . | |
| 2645022 | 4/1978 | Fed. Rep. of Germany | 164/150 |
| 2639241 | 7/1979 | Fed. Rep. of Germany . | |
| 2656022 | 8/1979 | Fed. Rep. of Germany . | |
| 7639367 | 12/1976 | France . | |
| 2007374 | 5/1979 | United Kingdom . | |

Primary Examiner—Harry N. Haroian
Attorney, Agent, or Firm—Brumbaugh, Graves, Donohue & Raymond

[57] ABSTRACT

An arrangement for measuring the distance of two oppositely arranged roller ways of a continuous casting plant comprises a measuring body capable of being pulled or pushed through the section between the roller ways. The measuring body has oppositely arranged contact surfaces touching the surface areas of the rollers, the distance-measuring device being fastened within the measuring body. In order to be able to determine the distance of the rollers with the greatest accuracy possible also with rollers that are not arranged opposite each other, the contact surfaces of the measuring body are comprised of elastically deformable spring steel strips whose longitudinal extension is larger than the axial distance of three neighbouring rollers of one of the roller ways. The spring steel strips are pressable towards the surface areas of the rollers by pressure units arranged between them and the distance-measuring device contacts the inner side of one of the spring steel strips.

19 Claims, 8 Drawing Figures

ARRANGEMENT TO BE USED IN A CONTINUOUS CASTING PLANT

BACKGROUND OF THE INVENTION

The invention relates to an arrangement for measuring the distance of two oppositely arranged roller ways of a continuous casting plant, comprising a measuring body capable of being pulled or pushed through the section between the roller ways, which measuring body includes oppositely arranged contact surfaces touching the surface areas of the rollers, and a distance-measuring device fastened within the measuring body.

An arrangement of this kind is known from U.S. Pat. No. 3,983,631. The measuring body of this known arrangement is made of an elastomeric material, such as rubber or plastics, and the distance-measuring device is embedded within this body. This arrangement has proved successful in continuous casting plants, however with the prerequisite that, for obtaining a faultless measured result, the rollers of the roller ways lie directly opposite each other. If the rollers of the roller ways are arranged in an offset manner, which means that not every roller of one roller way has a roller of the other roller way arranged exactly opposite, but that a roller of one roller way—viewed in the longitudinal direction of the roller ways—lies between two rollers of the other roller way, the distance of the roller ways can no longer be accurately measured with this arrangement. The body, which is made of an elastomeric material, in such a case avoids the one roller and is pressed too much in between the two rollers of the opposite roller way.

It is furthermore known from German Offenlegungsschrift No. 25 38 141 to equip an arrangement for measuring the roller distance with a casing from whose wall sliding rockers resiliently pressed outwardly stand off on one side, which rockers get into contact with two neighbouring rollers of one roller way. The casing itself rests on two rollers of the oppositely arranged roller way via sliding rockers rigidly mounted to it on the opposite side. Beside the rockers, distance-measuring devices are provided which get into contact with the surface areas of the rollers of one roller way by means of tracing heads. The rigidly designed sliding rockers, during each measuring process, form a tangent common to all of the rollers. Also with this arrangement, a faultless measured result is not possible unless the rollers of the two roller ways are arranged directly opposite each other, since this arrangement does not measure the distance of two rollers in the radial direction, seen from the center of curvature of the bending line of the strand, but the normal distance of the surface of an inner roller to the common tangent of two neighbouring outer rollers. Difficulties will arise in particular in the region of the arc of a strand guide, as well as in those roller way regions which show uneven conditions of curvature, such as the bending and straightening zones. Furthermore, difficulties will arise also in case the rollers are not evenly distributed over the total length of the roller ways. This is always the case in modern fast continuous casting plants, since at the beginning of the roller ways—immediately below the mould—rollers having very small diameters are arranged closely adjacent, whereas towards the end of the roller way the roller diameter—due to the solidification of the strand—may be chosen to be larger, which results in a greater roller division.

SUMMARY OF THE INVENTION

The invention aims at avoiding these disadvantages and difficulties and has as its object to design an arrangement of the initially-defined kind in a manner that it is possible to determine the distance of the roller ways with the greatest accuracy possible also with rollers that are not oppositely arranged, wherein the arrangement is to show faultless measured results also with roller divisions that are different over the longitudinal extension of the roller ways and with conditions of curvature that differ over the length of the roller ways.

This object is achieved according to the invention in that the contact surfaces of the measuring body are formed by elastically deformable spring steel strips whose longitudinal extension is greater than the axial distance of three neighbouring rollers of one of the roller ways, wherein the spring steel strips are pressable to the surface areas of the rollers by pressure units arranged between them and the distance-measuring device contacts the inner side of a spring steel strip.

Advantageously, the pressure units are distributed over the length of the spring steel strip, wherein, suitably, the pressure units are arranged at a distance approximately corresponding to the roller distance of neighbouring rollers ±30%.

According to a preferred embodiment, one of the pressure units is fixedly connected with one of the spring steel strips and the other pressure units are articulately connected with the spring steel strips, the pressure unit that is fixedly connected with the spring steel strip being connected with the spring steel strip by means of guide rods extending obliquely to the longitudinal direction of the arrangement.

Suitably, each guide rod is connected articulately with the spring steel strip and articulately and perpendicularly displaceably to the surface of the spring steel strips with the pressure unit.

In order to be able to use the arrangement for different roller-way distances which are adjustable in a continuous casting plant for various strand thicknesses, the pressure units are designed as spring cups with variable heights.

Suitably, the pressure units contact the spring steel strips with convex end surfaces, penetrating into bores of the spring steel strips, with pegs projecting from the convex end surfaces.

A preferred embodiment is characterized in that the distance-measuring device with one end is hinged to one of the spring steel strips and with its other end, which is movable relative to the hinged end, contacts the opposite spring steel strip, wherein advantageously the distance-measuring device is arranged between two pressure units.

Suitably, means for fastening the arrangement to a starter bar head are provided, the arrangement being displaceable along the width of the starter bar head and fixable in various positions. Thereby it is possible with this arrangement to measure also rollers, at different spots of their lengths, which are multiply divided over their lengths by a repeated pulling or pushing through of the arrangement between the roller ways.

In order to be able to exactly record also the position of the rollers, a further measuring body is arranged beside the distance-measuring device, which is articulately fastened to one of the spring steel strips with one end and whose other end, which is movable relative to the articulately fastened end, penetrates through a bore or through a recess of the oppositely arranged spring steel strip and is pressable against the surface areas of the rollers.

According to a preferred embodiment of continuous casting plants for slabs, the straddling force applied onto the spring steel strips by one pressure unit each ranges between 4 and 20 kN, preferably between 8 and 16 kN, wherein the ratio of the cross section (in $cm^2$) of one spring steel strip to the straddling force (in kN) of one pressure unit is in the region of from 0.8 to 5, preferably in a region between 1 and 2.5, the ratio of the cross section (in $cm^2$) of a spring steel strip to the roller distance (in cm) is in the region of between 1 and 0.6.

BRIEF DESCRIPTION OF THE DRAWINGS

The invention will now be explained in more detail by way of one embodiment and with reference to the accompanying drawings, wherein:

FIGS. 3 and 4 represent sections along lines III—III and IV—IV of FIGS. 1 and 2, respectively, on an enlarged scale;

DETAILED DESCRIPTION OF THE DRAWINGS

Figure 1:
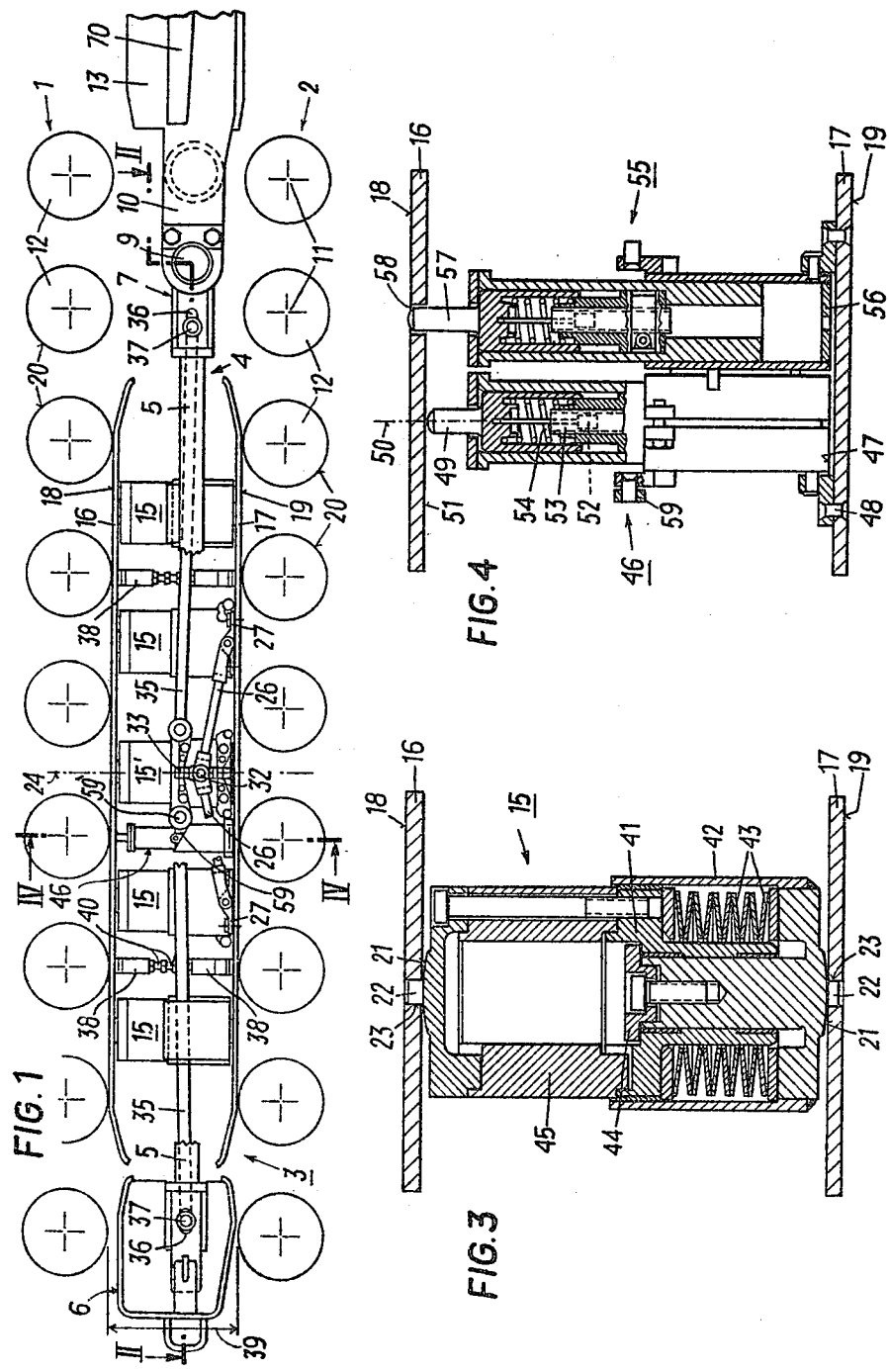
FIG. 1 is a side view of an arrangement according to the invention, partly sectioned.

Between the roller ways 1 and 2 of a strand guide of a continuous casting plant, an arrangement 3 for measuring the distance of the roller ways has been inserted. The arrangement 3 comprises a frame 4 formed by two narrow longitudinal beams 5, one exchangeable head section 6 as well as a foot section 7. The foot section has a bore 8 by which it is displaceable along a pin 9 which is fastened in a coupling piece 10 parallelly to the axes 11 of the rollers 12 of the roller ways 1, 2. The coupling piece 10 is fastened to a starter bar head 13 by means of a coupling 14.

Figure 6:
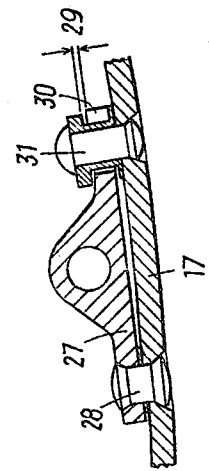
FIGS. 5 and 6 illustrate details also in section, the sections being made along lines V—V and VI—VI, respectively, of FIG. 2.

Within the frame 4, two spring steel strips 16, 17 are arranged, which are held at a distance and pressed asunder by five pressure units designed as spring cups 15, 15', and which extend approximately over six strand guiding rollers 12. The outer-side surfaces 18, 19 of the spring steel strips 16, 17 contact the surface areas 20 of the rollers 12 of the roller ways 1, 2. Instead of the spring cups, hydraulically or pneumatically actuated pressure medium cylinders or the like could be provided, to press the spring steel strips 16, 17 asunder. Each spring cup contacts the spring steel strips 16, 17 with convex end surfaces 21, wherein pegs 22 which project from the convex end surfaces 21 each penetrate, with little play, into a bore 23 of the spring steel strips 16, 17 in order to eliminate the sliding of the convex end surfaces 21 at the spring steel strips 16, 17. The middle spring cup 15' is connected with one of the spring steel strips 17 in a manner that, with its axis 24, it is directed at a right angle relative to this spring steel strip 17 and relative to the tangential surface 25 laid to the spring steel strip if the spring steel strip 17 is bent. For this purpose guide rods 26 are hinged to the spring steel strip 17, the hingeing being effected by means of an intermediate plate 27 which, as can be seen from FIG. 6, is fastened to the spring steel strip by a rivet 28 on the one hand and is connected with the spring steel strip 17 by a rivet 31 projecting through a slot 30 of the intermediate plate 27 with a play 29 on the other hand. The two guide rods 26 (on one side of the arrangement 3 each) also are articulately connected with each other, a pin 33 being mounted at this joint 32, which pin is directed perpendicularly to the spring steel strips 16, 17 and is displaceably guided within recesses provided at the middle spring cup 15'.

The middle spring cup 15' furthermore is provided with brackets in which four longitudinal guide rods 35 engage (two on either side of the arrangement), which are directed approximately parallel to the longitudinal beams 5 of the frame 4 and which, with their outer ends, are hinged to the head section 6 and to the foot section 7 of the frame 4. Both the head section and the foot section comprise longitudinal holes 36 directed in the direction of the longitudinal axis of the arrangement 3, through which pins 37 holding the longitudinal guide rods 35 extend, so that a certain movability of the middle spring cup 15' and thus the spring steel strips 16, 17 in the longitudinal direction of the arrangement 3 relative to the frame 4 is ensured.

Turnbuckles 38 guarantee the holding together of the two spring steel strips, so that the spring cups 15, 15' cannot slip with their pegs 22 out of the bores 23 of the spring steel strips 16, 17. The turnbuckles 38, however, allow for a reduction of the distance of the spring steel strips. In order to be able to use the arrangement 3 for different roller way distances 39, the maximum limitation by the turnbuckles 38 of the distance of the two spring steel strips is adjustable by means of the turnbuckles 38. For this purpose the bracing screws 40 of the turnbuckles either are turned or are exchanged for shorter or longer ones.

As can be seen from FIG. 3, each spring cup 15, 15' is comprised of a piston 41 and a cylinder 42, the piston 41 being pressed outwardly by means of cup springs 43 arranged inside the cylinder. A stop 44 provided on the cylinder 42 delimits the outward movement of the piston 41. The length of the piston is variable by means of exchangeable spacers 45, so that the height of the spring cup and thus the distance of the spring steel strips is variable for the purpose of adapting the arrangement to different strand cross-sectional formats (and thus to different roller way distances 39).

Between two middle spring cups 15, 15', a distance-measuring device 46 is arranged in a manner that, with one end 47, it is hinged to the spring steel strip 17 by pins 48, and with its other end which is designed as a tracing pin 49 and is movable relative to the first end 47 in the axial direction 50 of the distance-measuring device 46 contacts the inner side 51 of the opposite spring steel strip 16 (FIG. 4). In the interior of the distance-measuring device an iron core 52 is displaceable within a magnetic coil 53, the iron core 52 being connected with the movable end, i.e., the tracing pin 49. Thus the iron core 52 is moved with the tracing pin 49, wherein, depending on the displacement of the iron core 52, the magnetic field of the magnetic coil 53 is changed and transformed into an electric output signal. This signal—after a calibration carried out at first—directly indicates the mechanical displacement of the tracing pin 49. The electric output signal may be used, e.g. for recording measuring data on a battery-driven recording mechanism. A pressure spring 54 in the interior of the distance-measuring device takes care that the tracing pin 49 always contacts the inner side 51 of the spring steel strip 16.

Figure 2:
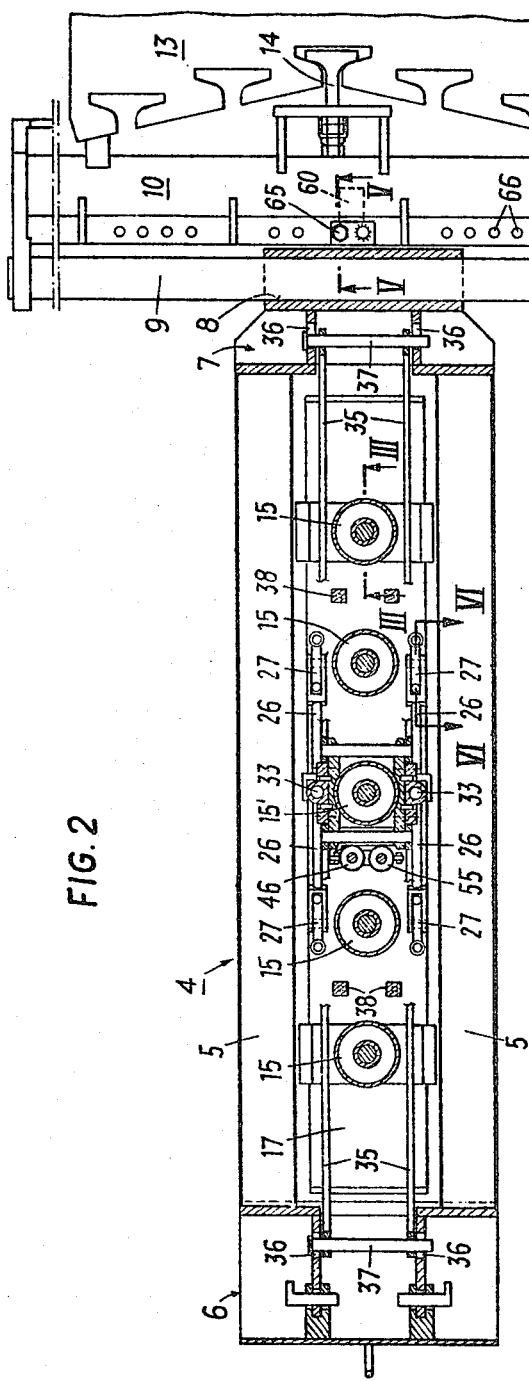
FIG. 2 is a section along line II—II of FIG. 1.

Beside the distance-measuring device 46, i.e., at the same distance from the head section 6, a further measuring body 55 (FIG. 2) is arranged, which also is hinged with one end 56 to the spring steel strip 17 and whose other end, which is movable relative to the first end and also designed as a tracing pin 57, projects through a bore 58 or any other recess of the oppositely arranged spring steel strip 16. The tracing pin 57 projects a bit beyond the surface of the spring steel strip coming into contact with the roller surfaces. When moving the arrangement 3 to pass by the rollers 12, the end that projects outwardly is pressed against the surfaces 20 of the rollers, wherein an output signal that is proportional to the displacement of the tracing pin 57 is generated in a manner analogous to that of the distance-measuring device 46. The axial direction of the distance-measuring device 46 is directed at a right angle to the planes of the spring steel strips and, with the spring steel strips bending through, at a right angle to the tangential planes laid to the spring steel strips at the distance-measuring device. The measuring bodies 46 and 55, which are connected with each other, cannot tilt, since they are hinged to a pin 59' located laterally on the middle spring cup 15', via a guide rod 59.

Figure 5:
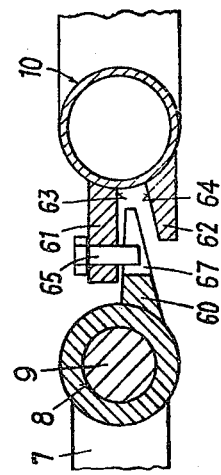

The foot section 7 includes a stop ledge 60 (FIG. 5) projecting between counter ledges 61, 62 of the coupling piece 10, with which it contacts the counter surfaces 63, 64 of the counter ledges 61, 62 of the coupling piece 10, if the arrangement 3 is outside of the roller ways 1, 2. Thereby it is reached that the arrangement 3 can be lifted in a position almost horizontal with the starter bar without tilting away downwardly. Nor can it tilt in the other direction in case the arrangement 3 is, e.g., in a perpendicular position above the bending zone of the roller ways. The stop ledge 60 is measured such that the arrangement 3 can follow the roller ways 1, 2 within the same without being impeded. A locking pin 65 secures the position of the foot section 7 along the pin 9. The coupling piece 10, in the counter ledge 61, comprises several bores 66 arranged along the pin 9 for the locking pin, so that the arrangement 3 can be fixed in different positions along the pin 9. The locking pin 65 projects into a slot 67 of the stop ledge 60. Thereby, it is possible in case of continuous casting plants for slabs to measure the roller ways both at the roller ends and in various positions between the roller ends.

The arrangement functions in the following manner: The spring steel strips 16, 17 straddled by the spring cups 15, 15' contact the rollers 12 when pulling or pushing the arrangement 3 through the roller ways 1, 2. The straddling force of the spring cups 15, 15' in this case is calculated such that inaccuracies in the strand guide can be balanced out, i.e. that each of the spring steel strips 16, 17 adapts to the rollers 12 and that a possibly present bearing play is eliminated, e.g., by lifting the upper rollers 12. Furthermore, part of the straddling force is required for bending the spring steel strips 16, 17 so that they will always contact the strand guiding rollers also in the circular arc and in the transition from the vertical into the circular arc, and from the circular arc into the horizontal. In order to meet these requirements, the balancing out of the forces applied by the spring cups 15, 15' and the dimensions (cross section) of the spring steel strips 16, 17 is necessary. It has proved advantageous if the spring steel strips are about 20 cm wide and 0.8 to 1 cm thick, the spring force of the spring cups in this case amounting to between 8 and 16 kN, depending on the size of a strand guiding roller. The cross-sectional dimensions of the spring steel strips also are in a certain relationship with the roller distance. The ratio of the cross section of one of the spring steel strips to the roller distance of neighbouring rollers is to be within a range of from 1 to 0.6.

Figure 7:
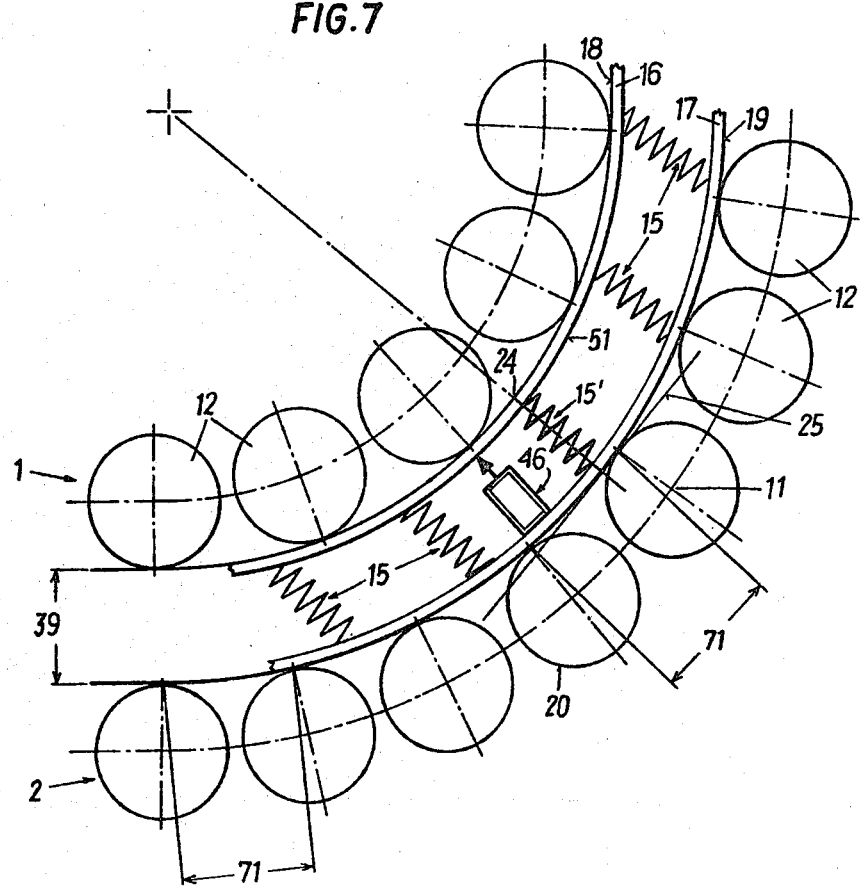
FIG. 7 schematically illustrates the utilization of the arrangement according to the invention in the arcuate part of a continuous casting plant.

As can be seen from FIG. 7, the spring steel strips adapt to the roller ways, the distance measuring device measuring the distance adjusting between the spring steel strips. For determining the roller way distance 39 the strengths (thicknesses) of the two spring steel strips 16, 17 are to be taken into consideration.

Figure 8:
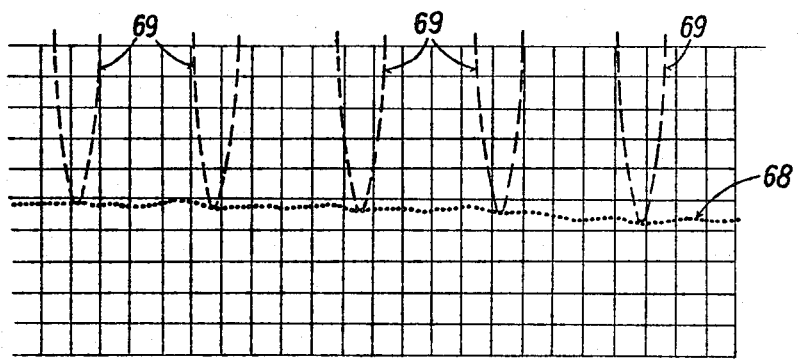
FIG. 8 represents an evaluation of measured values.

In FIG. 8 a measuring chart is illustrated. The dotted line 68 represents the value measured by the distance-measuring device 46. The dashed lines 69 indicate those measured values which have been traced by the measuring body 55, the tracing pin 57 of which contacts the surface areas 20 of the rollers 12. This measuring body thus also serves for recording the position of the rollers 12 on the measuring chart. The dashed lines, due to a distortion of the values on the abscissa and the ordinate, have the shape of an ellipse on the measuring chart. Suitably, the recording mechanism recording the measuring chart is arranged in a box 70 which is mounted on the coupling piece 10. It is, however, also possible to transmit the measured values towards outside by means of a trailing cable or also in a wireless manner by radio.

As can be seen from FIG. 7, the spring steel strips 16, 17 exactly follow the curvature of the roller ways. In order to reach this, the spring steel strips 16, 17 have to have a length that corresponds to at least twice the distance of two neighbouring rollers—which distance is denoted by 71 in FIG. 7—, so that each spring steel strip is in contact with at least three rollers 12 of a roller way when moving the distance-measuring device 46 to pass by a roller. Because the distance-measuring device 46 contacts the inner side 51 of the spring steel strip 16, the distance of the envelope of a roller way 1 to the envelope of the opposite roller way 2 is constantly measured, independently of the positions of the rollers 12, i.e., independently of the fact whether the rollers 12 of the two roller ways 1, 2 are exactly opposite each other or not.

What we claim is:

1. In an arrangement to be used in a continuous casting plant of the type including two oppositely arranged roller ways forming a section between them and each roller way being formed by a plurality of rollers, a measuring body for measuring the distance between the two oppositely arranged roller ways being provided, which measuring body is adapted to be moved between the section formed by the two oppositely arranged roller ways and includes a distance-measuring device fastened within said measuring body and oppositely arranged contact surfaces, said rollers having surface areas to be contacted by said contact surfaces, the improvement which is characterized in that said oppositely arranged contact surfaces of said measuring body are formed by elastically deformable spring steel strips having a longitudinal extension that is longer than the axial distance of three neighbouring rollers in one roller way, and in that pressure units are provided between said spring steel strips for pressing said spring steel strips against said surface areas of said rollers, said distance-measuring device contacting the inner side of a spring steel strip.

2. An arrangement as set forth in claim 1, wherein said pressure units are distributed over said longitudinal extension of said spring steel strips.

3. An arrangement as set forth in claim 2, wherein said pressure units are arranged at a distance approximately corresponding to the distance between the points of contact of two neighbouring rollers on said contact surfaces.

4. An arrangement as set forth in claim 3, wherein said distance is variable by ±30%.

5. An arrangement as set forth in claim 1, wherein one of said pressure units is fixedly connected with one of said spring steel strips and the remaining ones of said pressure units are articulately connected with said spring steel strips.

6. An arrangement as set forth in claim 5, further comprising guide rods extending obliquely to the longitudinal direction of the arrangement and connecting the pressure unit that is fixedly connected with a spring steel strip with that spring steel strip.

7. An arrangement as set forth in claim 6, wherein each of said guide rods is connected articulately with the respective spring steel strip and is connected articulately and displaceably in a direction perpendicular to the surface of said spring steel strips with the respective pressure unit.

8. An arrangement as set forth in claim 1, wherein said pressure units are designed as spring cups having a variable height.

9. An arrangement as set forth in claim 1, wherein said pressure units have convex end surfaces for contacting said spring steel strips and include pegs projecting from said convex end surfaces, and further comprising bores provided in said spring steel strips, said pegs projecting into said bores of said spring steel strips.

10. An arrangement as set forth in claim 1, wherein said distance-measuring device has a first end and a second end, said first end being hinged to one of said spring steel strips, and said second end, which is movable relative to said first end, contacting the oppositely arranged spring steel strip.

11. An arrangement as set forth in claim 1, wherein said distance-measuring device is arranged between two pressure units.

12. An arrangement as set forth in claim 5, further comprising a frame within which said spring steel strips are arranged and longitudinal guide rods extending approximately in the longitudinal direction of the arrangement for connecting said frame with the pressure unit that is fixedly connected with one of said spring steel strips.

13. An arrangement as set forth in claim 12, wherein said longitudinal guide rods are hinged to the pressure unit that is fixedly connected with one of said spring steel strips and to said frame.

14. An arrangement as set forth in claim 13, further comprising longitudinal holes arranged with their longitudinal extension directed in the longitudinal direction of the arrangement, and pins guided in said longitudinal holes for hingeing said longitudinal guide rods to said frame.

15. An arrangement as set forth in claim 1, further comprising a starter bar head and means for fastening the arrangement to said starter bar head, and wherein the arrangement is displaceable along the width of said starter bar head and fixable in various positions.

16. An arrangement as set forth in claim 1, further comprising a further measuring body arranged beside the distance-measuring device and having a first end articulately fastened to one of said spring steel strips and a second end movable relative to said first end, a bore or recess being provided in the oppositely arranged spring steel strip, and wherein said second end penetrates through said bore or recess and is pressable against said surface areas of said rollers.

17. An arrangement as set forth in claim 1, wherein a straddling force is exerted on said spring steel strips by each of said pressure units, said straddling force amounting to between 4 and 20 kN, the ratio between the cross section (in $cm^2$) of one of said spring steel strips to said straddling force (in kN) of one pressure unit ranging approximately between 0.8 and 5.

18. An arrangement as set forth in claim 17, wherein said straddling force amounts to between 8 and 16 kN and said ratio is in the region of between 1 and 2.5.

19. An arrangement as set forth in claim 1, wherein the cross section (in $cm^2$) of one of said spring steel strips is at a ratio to the roller distance (in cm) of neighbouring rollers, said ratio ranging between 1 and 0.6.

* * * * *